Oct. 25, 1949.
L. M. ELLISON
2,486,135
PRESSURE GAUGE HAVING A COMBINED INCLINED AND VERTICAL TUBE
Filed Oct. 3, 1945
2 Sheets-Sheet 1
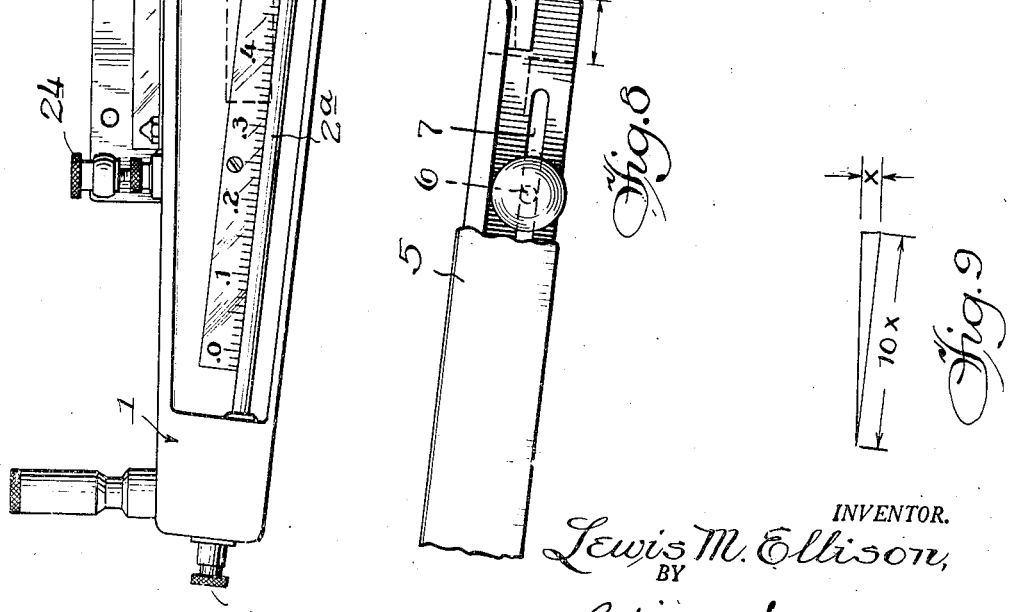
INVENTOR.
Lewis M. Ellison,
BY
Parkinson & Lane
Attys.

Oct. 25, 1949.　　　　L. M. ELLISON　　　　2,486,135
PRESSURE GAUGE HAVING A COMBINED
INCLINED AND VERTICAL TUBE
Filed Oct. 3, 1945　　　　　　　　　　2 Sheets-Sheet 2
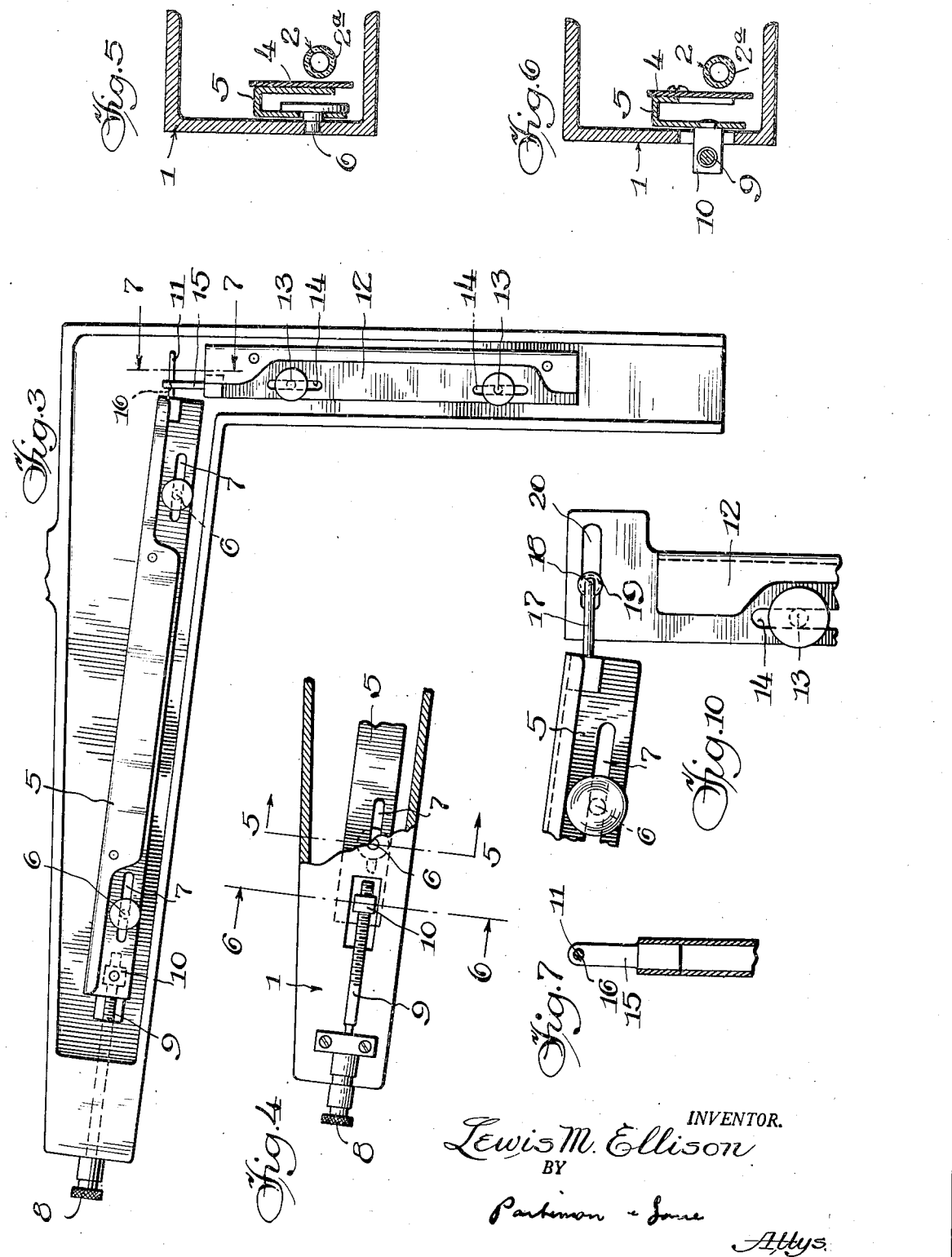

Patented Oct. 25, 1949

2,486,135

UNITED STATES PATENT OFFICE 2,486,135

PRESSURE GAUGE HAVING A COMBINED INCLINED AND VERTICAL TUBE

Lewis M. Ellison, Winnetka, Ill., assignor to Ellison Draft Gage Company, Inc., Chicago, Ill., a corporation of Illinois Application October 3, 1945, Serial No. 620,042

6 Claims. (Cl. 73—401)

1

This invention relates to adjustment means for minus, plus or differential air pressures on an inclined-vertical gage so that the zero point is in correct position for both the vertical scale and the vernier or micrometer inclined scale.

Difficulty has been experienced in combined inclined and vertical tubes in securing the zero point correction because the two scales must move a correct predetermined amount relative to each other.

An object of the invention is to provide a direct means of simultaneously correcting the position of both the inclined tube scale and the vertical tube scale.

An object is to secure zero correction which consists of means of moving the vertical scale an amount exactly equal to the vertical component of the movement of the inclined scale so that the reading of the vertical movement of the column may be determined and the inclined scale may be consulted for more precisely reading the equivalent vertical movement of the column.

In the drawings:

Figure 1 is a front view of the gage showing the vertical gage in inches and inclined gage in tenths of inches.

Figure 2 is a side view of the same.

Figure 3 is a front view of the gage with the scales removed to show some of the operating mechanism.

Figure 4 is a fragmentary view of the back of the gage.

Figure 5 is a view in vertical cross section on the line 5—5 of Figure 4.

Figure 6 is a view in vertical cross section on the line 6—6 of Figure 4.

Figure 7 is a view in vertical cross section on the line 7—7 of Figure 3.

Figure 8 is an enlarged view of a portion of the gage with parts broken away to show the operating mechanism at the corner adjacent the vertical inclined scale.

Figure 9 is a diagrammatic view showing the resultant of the movement illustrated in Figure 8.

Figure 10 is a modification of the construction illustrated in Figure 8.

Referring more particularly to the novel embodiment selected to illustrate the invention, the invention comprehends a frame 1 upon which is mounted a tube 2 paralleling the vertical portion of the frame and bent at its upper end to form an inclined portion 2a along the upper part of the frame 1. A scale 3 calibrated in inches and fractions thereof is mounted adjacent the vertical portion of the tube and a vernier or micrometer scale 4, calibrated preferably to one-tenth of an inch and fractions thereof, is mounted on the upper portion of the frame 1 and parallel to the inclined portion 2a of the tube 2.

Serving to simultaneously obtain the zero point correction between the vertical and the inclined scales is a mechanism consisting of a sub-frame 5, which has limited movement in an inclined direction on the upper part of the frame 1. It is attached by suitable bolt 6 and slot 7 connections with the frame 1 to permit limited movement at an incline relative to the vertical portion of the frame. Such movement is obtained by manual manipulation of the screw 8 which has a threaded portion 9 threaded into a lug 10 attached to the sub-frame 5. As the screw 8 is rotated the sub-frame 5 is moved longitudinally with respect to the upper portion of the frame 1.

Mounted on the movable sub-frame 5 is the vernier scale 4 and attached at one end of this sub-frame and extending outwardly therefrom is a rod 11. This rod 11 extends from the sub-frame 5 at an angle therewith so that it is at all times at right angles to the vertical portion of the frame 1. A sub-frame 12 is attached by suitable spaced bolts or threaded studs 13 and slots 14 to the vertical portion of the frame 1 in such manner as to permit vertical movement and longitudinal adjustment of the sub-frame 12 with respect to the vertical portion of the frame 1. Attached to the upper portion of sub-frame 12 is a post 15 having an opening 16 adapted to receive the rod 11 and permit adjustment or movement of the latter therethrough. Mounted on sub-frame 12 is the vertical scale 3.

It will thus be seen that as the sub-frame 5 bearing the vernier scale 4 is moved along the inclined or upper portion of the frame 1, the rod 11 having sliding engagement with the opening 16 of the post 15 will elevate the sub-frame 12 carrying the vertical scale 3, so that the vertical scale will be moved an amount exactly equal to the vertical component of the movement of the inclined scale, and the horizontal movement of the vernier scale 4 is not transmitted to the vertical scale because the rod 11 slides through the opening 16 snugly but freely. The relative movement of the vernier or micrometer scale 4 with respect to the vertical scale 3 is diagrammatically or graphically illustrated in Figure 9.

Various modifications may be made in controlling the relative movement of the sub-frame 5 with respect to the sub-frame 12. In Figure 10 one form of modification is shown whereby the rod 17, extending at right angles to the vertical portion of the frame, has its end 18 bent and retained by one or more washers 19 for sliding engagement with the slot 20 which extends in a horizontal position at the top of the vertical portion of the frame and therefore at right angles to the sub-frame 12. A spirit level 21 is mounted on the upper portion of the frame 1 and to facilitate the positioning of the gage in proper position, it is pivotally mounted at 22 upon a bracket 23 with leveling accomplished by means of a screw adjustment 24. An oil expansion compensating chamber is shown as provided at 25 (Figures 1 and 2) with a tube for liquid filling being indicated at 26.

From the above description and the disclosure in the drawings, it will be appreciated that the invention comprehends a novel inclined-vertical gage especially adapted for minus, plus or differential air pressures and multiplying the low readings on the inclined tube. By the novel means and mechanism shown, the present gage provides a direct means of simultaneously correcting the position of both the inclined tube scale 4 and the vertical tube scale 3.

Having thus disclosed the invention, I claim:

1. In a pressure gage having a combined inclined and vertical tube, an inclined tube scale and a vertical tube scale each slidably mounted in the gage, interconnecting projections on said scales, and manually manipulated control means to slidably adjust the inclined scale and through said interconnecting projections cause sliding movement of both the inclined and vertical tube scales for simultaneously correcting the position of both scales.

2. In a pressure gage having a combined inclined and vertical tube, an inclined and a vertical tube scale, said inclined and vertical tube scales being slidably mounted with respect to the tube, interconnecting projections on the adjacent ends of these scales, and a manually manipulated control connected to and slidably moving said inclined tube scale and through the interconnecting projections slidably moving the vertical scale an amount equal to the vertical component of the movement of the inclined scale.

3. In a pressure gage having a combined inclined and vertical tube, an inclined tube scale and a vertical tube scale slidably mounted in the gage, means slidably interconnecting the adjacent ends of these scales, and mechanism for adjusting the zero point of the liquid column in the tube and including a manually manipulated control having rotatable connection with said inclined scale for slidably moving the scales simultaneously.

4. In a pressure gage having a combined inclined and vertical tube, an inclined and a vertical tube scale slidably and adjustably mounted with respect to the tubes, a horizontally arranged rod secured upon the inclined scale, an apertured member secured to the upper end of the vertical scale and slidably engaging said rod, and means for moving the inclined scale and rod and through the latter's connection to the vertical scale simultaneously correcting the position of both scales.

5. In a pressure gage having a combined inclined and vertical tube, an adjustable inclined tube scale, an adjustable vertical tube scale, said scales being slidably mounted in the gage, and means for simultaneously correcting the position of both scales including a member projecting from each of the adjacent ends of the inclined and vertical scales with the end of one of said members being apertured and slidably engaging the end of the other member to provide a sliding connection between the free ends of said members.

6. In a pressure gage having a combined inclined and vertical tube, an inclined and a vertical tube scale mounted for sliding movement in the gage, and means for moving the vertical scale an amount equal to the vertical component of the movement of the inclined scale, said means including a projection on each of the adjacent ends of the inclined and vertical scales and a sliding connection between the ends of said projections, said projections and connection being such as to simultaneously correct the position of both scales to adjust the zero point thereof in relation to the meniscus of the liquid column in the tube.

LEWIS M. ELLISON.

REFERENCES CITED

The following references are of record in the file of this patent:

Ellison Power Plant Instruments Pamphlet for Aug. 1914 by Lewis M. Ellison, Chicago, Ill. (A copy of this pamphlet is in Class 73, sub-class 401, Div. 36, U. S. Pat. Off.)